G. L. ROBERTSON.
SHOCK ABSORBER.
APPLICATION FILED MAY 16, 1911.
1,006,283.
Patented Oct. 17, 1911.
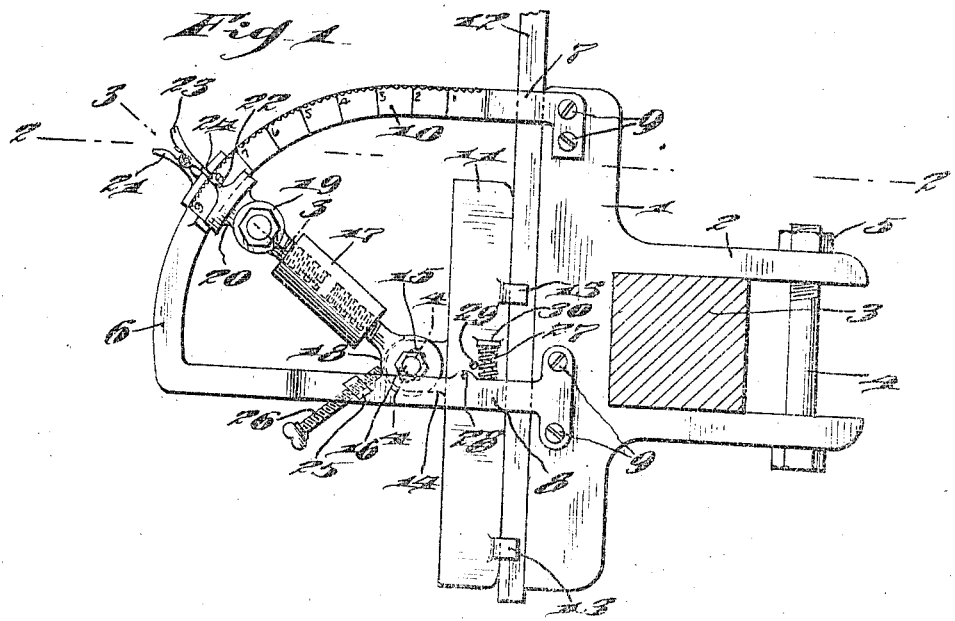
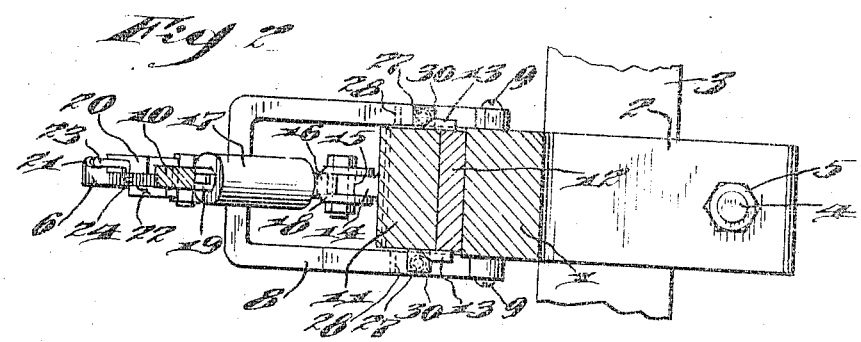
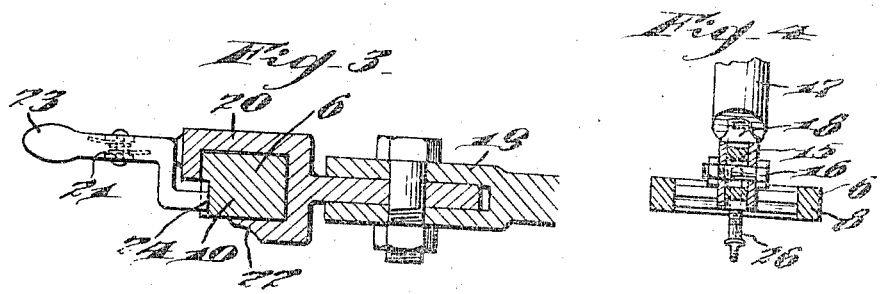
Witnesses
Thno. Rosemann
R. N. Krenkel.
Inventor
George L. Robertson,
By Joshua R. H. Potts,
Attorney

UNITED STATES PATENT OFFICE.

GEORGE LAWSON ROBERTSON, OF PHILADELPHIA, PENNSYLVANIA.

SHOCK-ABSORBER.

1,006,283.  Specification of Letters Patent.  Patented Oct. 17, 1911.

Application filed May 16, 1911. Serial No. 627,384.

*To all whom it may concern:*

Be it known that I, GEORGE L. ROBERTSON, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, the object of the invention being to provide a device of this character which may be secured to the axle of any vehicle, and which is adapted to absorb the shock and prevent sudden rebound of the body of the vehicle due to the action of the springs.

A further object is to provide improvements of this character which may be adjusted in accordance with the weight of the body and the strength of the springs, and which may be moved into or out of operative position, and held in either position.

With these and other objects in view, the invention consists in certain novel features of construction and combinations and arrangements of parts, as will be more fully hereinafter described and pointed out in the claims.

In the accompanying drawings Figure 1, is a view in side elevation illustrating my improvements. Fig. 2, is a view in section on the line 2—2 of Fig. 1. Fig. 3, is an enlarged view in section on the line 3—3 of Fig. 1, and Fig. 4, is a view in section on the line 4—4 of Fig. 1.

1, represents a casting which constitutes a fixed brake shoe having perforated ears 2 adapted to straddle an axle 3, and 4 is a clamping bolt which is projected through perforated ears 2, and secured by means of a nut 5 to clamp the casting onto the axle.

A segment 6 is provided with bifurcated ends 7 and 8 respectively, which straddle the casting 1, and are secured thereto by means of screws 9 or otherwise, and the curved portion 10 of said segment constitutes a tooth rack, which is provided with a suitable scale for a purpose which will be explained.

11, represents a brake shoe which is adapted to bear against a vertical bar 12 secured to the body of the vehicle (not shown). This brake shoe 11 is made with integral guide fingers 13, projecting over the edges of bar 12, and on the back face of said shoe, a lug 14 is provided having an inclined slot 15 to receive a pivot bolt 16.

This pivot bolt is passed through the bifurcated circular end of a link 17, and this link 17 comprises two ends 18, and 19, precisely alike, each of them constituting screw-threaded rods with circular bifurcated ends, and said screw-threaded rods engaging in an adjusting sleeve, which when turned either lengthens or shortens the link as is well understood. The outer end of the link is pivotally connected to a sliding bracket 20, which partially incloses the curved segment 10, and one member of this bracket constitutes a pointer 22, to register with a scale on the segment. The outer end of the bracket 20 supports a fixed finger lever 21, and a pivoted spring-pressed lever 23 having a tooth 24 thereon to engage between the teeth in the rack on segment 10, so as to hold the link 17 at the desired adjustment. It will be noted that the curved portion 10 is curved in the arc of a circle eccentric to bolt 16, so that the movement of the link has a tendency to move brake shoe 11 toward or away from bar 12, this adjustment being necessary as the shoe wears.

A cross bar 25 is fixed in the bifurcated end 8 of bracket 6, and through this bar 25, a thumb screw 26 projects, and engages the rounded portion of the inner end of link 17, so as to prevent a too radical downward and rearward movement of the shoe 11, but compel the latter to remain in operative position.

By reason of the inclined slot 15, any downward movement of shoe 11 tends to draw the shoe away from bar 12, and any upward movement tends to move the shoe toward the bar 12.

A coiled spring 27 is located between the bifurcated end of bracket 6, and a lug 30 on shoe 11 tends to hold the shoe in normal position. To lock the shoe in an abnormal or useless position, openings 28 and 29 respectively are provided in end 8, and shoe 11, for the reception of a pin, nail, or other suitable device (not shown) to hold the shoe away from bar 12.

The normal operation is as follows: Assuming the shoe to be properly adjusted by means of the link 17 to take up wear on the shoe, when the wheels of the vehicle strike a sudden irregularity in the road, the vehicle body moves downwardly, and this movement is not resisted because as the shoe 11 is carried downwardly, it is moved away from gripping engagement with the bar 12. The tendency of the springs, is to throw the body suddenly upwardly, but as bar 12 begins this sudden upward movement, it draws the shoe 11 toward casting 1 to clamp the bar 12, and permit the body to rise slowly without the sudden recoil action of the spring being appreciable.

By moving the link 17, and locking it at various positions as above described, the wear of the shoe may be taken up, and to hold the shoe to its work, the screw 26 may be adjusted so that the device may be regulated to suit any vehicle in accordance with the weight of its body, and the power of its springs.

When traveling over smooth streets, and the shock absorber is not desired, shoe 11 may be moved downwardly until the openings 28 and 29 register, when a pin, or nail may be inserted in these openings so as to hold the shoe out of working position.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a device of the character described, the combination with a fixed brake shoe, a segment secured to the fixed brake shoe, a link connected to the segment, a movable shoe connected to the link, a bar for attachment to a vehicle body, and positioned between said shoes, and a spring normally holding the movable shoe against the bar, substantially as described.

2. In a device of the character described, the combination with a fixed brake shoe, a segment secured to the fixed brake shoe, a link connected to the segment, a movable shoe connected to the link, a bar for attachment to a vehicle body, and positioned between said shoes, a spring normally holding the movable shoe against the bar, and means for adjusting the length of said link, whereby the movable shoe may be adjusted toward and away from the fixed shoe, substantially as described.

3. In a device of the character described, the combination with a fixed brake shoe, and a movable brake shoe opposing the same, of a vertical movable bar positioned between said shoes and for attachment to a vehicle body, of means pivotally supporting said movable shoe, whereby the downward movement of said bar causes the movable shoe to move away from the bar, and the upward movement of said bar compels the movable shoe to clamp the bar against the fixed shoe, said pivotal supporting means constituting a link pivotally connected to said shoe, a segmental guide bar curved eccentrically to the pivotal connection between the link and the shoe, a bracket movable on said segmental guide and pivotally connected to said link, substantially as described.

4. In a device of the character described, the combination with a fixed brake shoe, a segment secured to the fixed brake shoe, a link connected to the segment, a movable shoe connected to the link, a bar for attachment to a vehicle body, and positioned between said shoes, means for adjusting the length of said link, whereby the movable shoe may be adjusted toward and away from the fixed shoe, and springs exerting pressure on said movable shoe tending to move the shoe in a direction to pivot the link and hold the shoe in contact with the bar, substantially as described.

5. In a device of the character described, the combination with a fixed brake shoe, and a movable brake shoe opposing the same, of a vertical movable bar positioned between said shoes and for attachment to a vehicle body, of means pivotally supporting said movable shoe, whereby the downward movement of said bar causes the movable shoe to move away from the bar, and the upward movement of said bar compels the movable shoe to clamp the bar against the fixed shoe, said pivotal supporting means constituting a link pivotally connected to said shoe, a segmental guide bar curved eccentrically to the pivotal connection between the link and the shoe, a bracket movable on said segmental guide and pivotally connected to said link, said segment having a toothed edge, a spring-pressed finger lever on said bracket adapted to engage between the teeth of the segment and hold the link at various angular adjustments, said link comprising two sections oppositely screw-threaded, an adjusting sleeve internally screw-threaded to receive the ends, a scale on said segment, and a pointer on the bracket registering with the scale, substantially as described.

6. A device of the character described, comprising a fixed shoe adapted to be secured to the axle of a vehicle, and a movable brake shoe opposing the same, a bracket having bifurcated ends secured to said fixed shoe providing a curved segment, a lug on said movable shoe having an inclined slot therein inclining away from the fixed shoe from top to bottom of said slot, a link, a bolt projecting through said slot and pivotally connecting the link to the lug, means connected to the outer end of said link and movable on the segment, whereby said movable shoe is adjusted, a bar for attachment to a vehicle and adapted to move vertically between said shoes and through the bifurcated ends of said bracket, a lug on said movable shoe above the lower member of said bracket, and a coiled spring positioned between said lug and bracket, substantially as described.

7. A device of the character described, comprising a fixed shoe adapted to be secured to the axle of a vehicle, and a movable brake shoe opposing the same, a bracket having bifurcated ends secured to said fixed shoe providing a curved segment, a lug on said movable shoe having an inclined slot therein inclining away from the fixed shoe from top to bottom of said slot, a link, a bolt projecting through said slot and pivotally connecting the link to the lug, means connected to the outer end of said link and movable on the segment, whereby said movable shoe is adjusted, a bar for attachment to a vehicle and adapted to move vertically between said shoes and through the bifurcated ends of said bracket, a lug on said movable shoe above the lower member of said bracket, a coiled spring positioned between said lug and bracket, said lower member of the bracket having an opening therein, said movable shoe having an opening therein adapted to register with the opening in the bracket when the shoe is in an inoperative position, and said openings adapted to receive a holding device, substantially as described.

8. A device of the character described, comprising a fixed shoe adapted to be secured to the axle of a vehicle, and a movable brake shoe opposing the same, a bracket having bifurcated ends secured to said fixed shoe providing a curved segment, a lug on said movable shoe having an inclined slot therein inclining away from the fixed shoe from top to bottom of said slot, a link, a bolt projecting through said slot and pivotally connecting the link to the lug, means connected to the outer end of said link and movable on the segment, whereby said movable shoe is adjusted, a bar for attachment to a vehicle and adapted to move vertically between said shoes and through the bifurcated ends of said bracket, a lug on said movable shoe above the lower member of said bracket, a coiled spring positioned between said lug and bracket, a cross bar fixed in the lower bifurcated end of said bracket, and a set thumb screw positioned in said bar and bearing against the lower end of said link, substantially as described.

9. A device of the character described, comprising a fixed shoe adapted to be secured to the axle of a vehicle, and a movable brake shoe opposing the same, a bracket having bifurcated ends secured to said fixed shoe providing a curved segment, a lug on said movable shoe having an inclined slot therein inclining away from the fixed shoe from top to bottom of said slot, a link, a bolt projecting through said slot and pivotally connecting the link to the lug, means connected to the outer end of said link and movable on the segment, whereby said movable shoe is adjusted, a bar for attachment to a vehicle and adapted to move vertically between said shoes and through the bifurcated ends of said bracket, a lug on said movable shoe above the lower member of said bracket, a coiled spring positioned between said lug and bracket, said lower member of the bracket having an opening therein, said movable shoe having an opening therein adapted to register with the opening in the bracket when the shoe is in an inoperative position, and said openings adapted to receive a holding device, a cross bar fixed in the lower bifurcated end of said bracket, and a set thumb screw positioned in said bar and bearing against the lower end of said link, substantially as described.

In testimony whereof I have signed my name to this specification in the presence of two subscribing witnesses.

GEORGE LAWSON ROBERTSON.

Witnesses:
R. H. KRENKEL,
CHAS. E. POTTS.